DIRECT STATION SELECTION TELEPHONE SET EMPLOYING PROXIMITY TYPE SELECTOR SWITCHES

Filed May 25, 1967 6 Sheets-Sheet 1

INVENTORS R. L. CERBONE
M. A. FLAVIN
N. R. HALL
J. W. RIEKE
BY E. J. Okuder
ATTORNEY Jan. 27, 1970 R. L. CERBONE ET AL 3,492,440
DIRECT STATION SELECTION TELEPHONE SET EMPLOYING PROXIMITY TYPE SELECTOR SWITCHES
Filed May 25, 1967 6 Sheets-Sheet 2

Jan. 27, 1970 R. L. CERBONE ET AL 3,492,440

DIRECT STATION SELECTION TELEPHONE SET EMPLOYING PROXIMITY TYPE SELECTOR SWITCHES

Filed May 25, 1967 6 Sheets-Sheet 3

Jan. 27, 1970 R. L. CERBONE ET AL 3,492,440

DIRECT STATION SELECTION TELEPHONE SET EMPLOYING PROXIMITY TYPE SELECTOR SWITCHES

Filed May 25, 1967 6 Sheets-Sheet 5

3,492,440

DIRECT STATION SELECTION TELEPHONE SET EMPLOYING PROXIMITY TYPE SELECTOR SWITCHES

Ralph L. Cerbone, Michael A. Flavin, Norris R. Hall, and John W. Rieke, Indianapolis, Ind., assignors to Bell Telephone Laboratories, Incorporated, Murray Hill and Berkeley Heights, N.J., a corporation of New York Filed May 25, 1967, Ser. No. 641,191
Int. Cl. H04m *1/26;* H01h *35/00*
U.S. Cl. 179—90 14 Claims

ABSTRACT OF THE DISCLOSURE

A plurality of proximity switches are fabricated on a common plastic sheet or substrate. The switch sheets, which may be multipled in book, card or scroll form, are mounted on a direct station selection or repertory dialer type telephone set in a manner that ensures ready access to each individual proximity switch. The touch-operation of any switch initiates the establishment of a communication path between the set and a distant station corresponding to that switch.

BACKGROUND OF THE INVENTION

Field of the invention

This invention relates to direct station selection telephone sets and more particularly to the ulitization of proximity type selector switches with such sets.

Description of the prior art

In the field of telephony, a number of systems are known that permit a subscriber at one station to initiate the establishment of a communication path to any one of a selected group of distant stations simply by operating a single key, or a pair of keys, which may be common pushbutton operated switches for example. Such systems avoid the usual requirement for the successive manual operation of a dial mechanism normally employed to generate the particular 7 or 10 digit dial signal that corresponds to a selected directory number.

Telephones of the type indicated are not restricted to any particular circuit arrangement but instead involve a number of different circuit and system forms. The term "direct station selection," abbreviated DSS, is employed herein generically to designate any telephone system or set that provides for single key or limited key dialing. One DSS arrangement, for example, is the conventional repertory dialer which may be combined with a rotary dial telephone set as shown by J. H. Ham et al., in U.S. Patent 2,941,043, issued June 14, 1960, or with a Touch-Tone or multifrequency signaling dial telephone set as shown by R. A. Miller et al. in U.S. Patent 3,243,-517, issued Mar. 29, 1966. Repertory dialers employ built-in memory units, typically magnetic, that provide storage space for recording a selected group of directory telephone numbers. Access to a particular number is normally provided by rotating a drum or the like to expose written indicia of the party corresponding to that number. A single key is then depressed to initiate automatic dialing of the number selected.

A somewhat different form of DSS is disclosed by R. A. Plyer in U.S. Patent 3,115,551, issued Dec. 24, 1963, that shows a key telephone system employing a multibutton key set at each station. Each station may gain direct access to any other station in the system by the operation of a single key or pushbutton that corresponds to the station to be called. In this system, connecting functions and switching capabilities are removed from the telephone set and are located instead in convention common equipment known as station concentrators or line connectors. A similar DSS system employing multifrequency or Touch-Tone signaling is shown by R. A. Plyer in U.S. Patent 3,301,967, issued Jan. 31, 1967.

Various additional DSS arrangements or modified DSS systems are also known in the prior art, including those that utilize central office storage or storage in memory apparatus situated at some convenient intermediate location between the central office and the participating stations. Such arrangements are also commonly identified as abbreviated dialing systems or shared memory repertory systems.

All of the DSS systems indicated above and all known related systems share a common limitation. The number of stations that may be called directly from a given station by the operation of a single switch is closely restricted by the physical spaced required for an array of station selection keys or pushbuttons. A dozen pushbuttons or even several dozen may reasonably be accommodated on the face of a telephone unit of somewhat expanded size as illustrated by the commercially available Call Director telephone set or by the multibutton key set in U.S. Patent 3,115,551, cited above. Beyond that point, however, the space required may exceed even the key space of a PBX unit, a requirement that would obviously be unacceptable to the average telephone subscriber.

The restriction on the number capacity of a DSS telephone set is imposed almost entirely by the practical limit on selector key space. Limits imposed on number capacity by the space requirements of memory or storage units and related interconnections are not significant, owing to the availability of low volume high capacity storage means such as ferrite sheet memory systems and the like and to the availability of integrated circuit techniques.

A broad object of the invention is to simplify DSS telephone sets.

A more specific object is to reduce the space required for a multi-key array in a telephone set.

SUMMARY OF THE INVENTION

The foregoing and related objects are achieved in accordance with the principles of the invention by the employment of uniquely arranged proximity switches in a direct station selection telephone set in lieu of the contional keys or pushbuttons normally utilized to initiate station selection. Various types of proximity switches may by employed. In accordance with a key feature of the invention, however, however, the capactive element or elements of each of the proximity switches is mounted on a common substrate, which may be a sheet of plastic for example. Alternatively, each group in a plurality of groups of proximity switches may be frabricated on a common respective substrate sheet. One element of each proximity switch comprises a touch-button and touch-operation of the button furnishes a capacitive path to ground.

Circuitry associated with the proximity switches includes a single common oscillator and, for each switch, a respective signal level detector. Depending upon the particular type of switch and upon the circuit arrangement employed, touch-operation of a selected switch effects an attenuation of the oscillator signal or applies the oscillator signal to the proper detector circuit. In either case the signal change is sensed by the detector circuit which in turn generates a suitable output to effect a switch closure that initiates a dialing or switching cycle.

An important aspect of the invention deals with the physical arrangement of the proximity selector switches. Preferably, as indicated above, a number of switches are mounted on the same common substrate which may be a sheet of plastic or the like. An entire stack of such sheets may then be assembled in a book-like arrangement which is mounted on the face of the DSS set.

Alternatively, substrate sheets, each including a number of selector switches together with suitable adjacent markings to identify the particular station associated with each switch, may be fabricated in the form of small cards. Such cards, arranged alphabetically for example, may be filed in a drawer provided in the base of the DSS set or in some other suitable filing receptacle with means providing electrically conductive paths from the card-mounted switches to the associated circuitry within the DSS set housing.

Still another arrangement in accordance with the invention utilizes a single common relatively thin substrate for all of the selector switches. This substrate is stored in a rotatable scroll form within the DSS set housing. Manual or power driven turning of the scroll selectively exposes one or more of the switches and marking indicia to visual and manual access through a suitable aperture or window. Automatic dialing may then be initiated simply by touching the selected switch.

It is evident, therefore, that the principles of the invention are broadly applicable to a wide variety of DSS telephone sets and systems. In brief, these principles may be turned to account in any telephone system employing a single or limited number of contact closures (other than conventional dialing) at one telephone station to initiate the establishment of a communication path between that station and a distant station.

DETAILED DESCRIPTION

Figure 1:
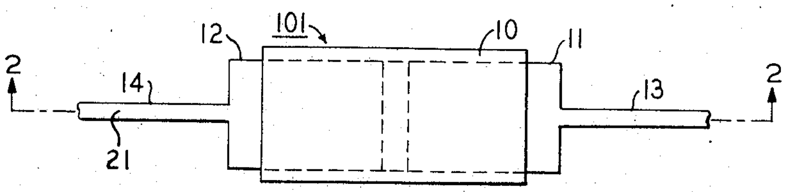
FIG. 1 is a plan view of a sketch of one type of proximity switch in accordance with the invention.
Figure 2:
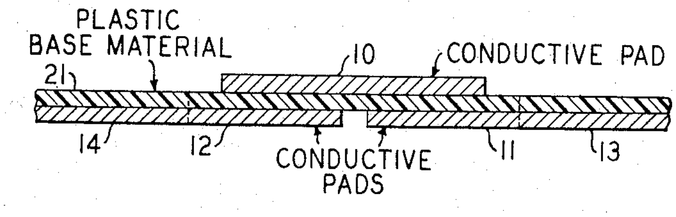
FIG. 2 is a cross section of the switch shown in FIG. 1.

The proximity switch 101 shown in FIGS. 1 and 2 includes a first conductive pad or touch-button 10 affixed to a supporting sheet 21 which may be formed from any suitable plastic material such as polyethylene, Teflon or Mylar for example. Two additional conductive pads 11 and 12 are affixed to the opposite side of the sheet 21. Leads 13 and 14, which extend from the pads 11 and 12 respectively, may be encapsulated in extended portions of the supporting sheet 21.

Figure 3:
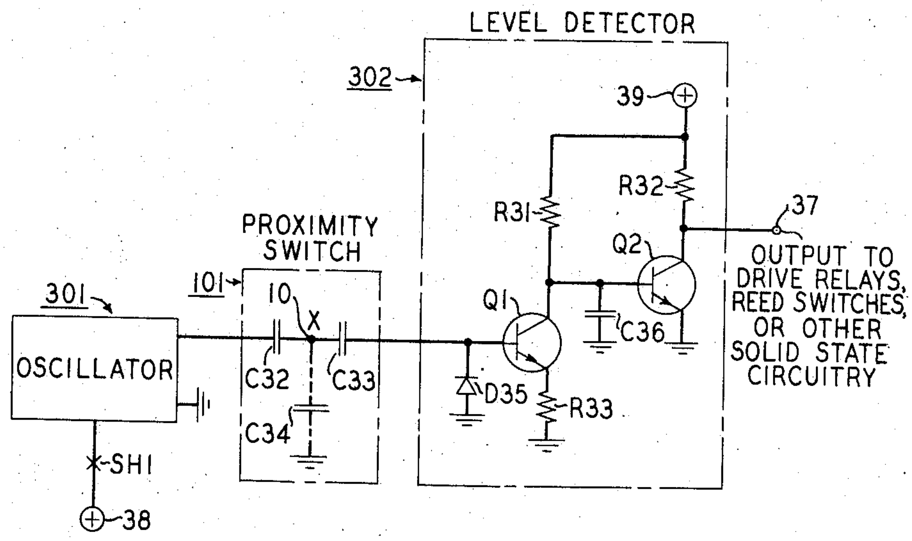
FIG. 3 is a schematic circuit diagram of the detector circuitry associated with a single proximity selector switch in accordance with the invention.

The resulting circuit equivalent of the switch 101 is shown in FIG. 3. Specifically, the capacitance between the pad 10 and the pad 12 is the equivalent of a capacitor C32, and, similarly, the capacitance between the pad 10 and the pad 11 is the equivalent of a capacitor C33. Touching the top pad or touch-button 10 with the finger is the equivalent of introducing an additional capacitor C34, connecting point X to ground. As a result, the three conductive pads 10, 11 and 12, in combination with the plastic sheet 21, form a T attenuator of capacitive elements whenever the touchbutton 10 is "operated" or touched by the subscriber.

In order to effect a switch closure to initiate the establishment of a communication path between two stations in response to the operation of the proximity switch 101, the switch is combined with additional circuitry as shown in FIG. 3. The additional circuitry includes an oscillator 301 and a level detector circuit 302. A separate level detector circuit is required for each proximity switch but only a single oscillator is required for any plurality of proximity switches and level detector circuits.

The oscillator 301 may advantageously be any one of a number of types of low power transistor oscillators preferably having an operating frequency in the range of 10–20 kHz. Power to the oscillator 301 may be furnished continuously over the telephone line, or may be applied from the line when the switch hook SH1 is operated or, as shown, may be supplied from a local power source through the switch hook SH1. The level detector 302 includes a pair of direct coupled transistors Q1 and Q2 in common emitter circuit configuration. Diode D35 affords protection for the base-emitter junction for transistor Q1. Resistors R31, R32 and R33 in combination with the power source 39 establish suitable biasing potentials for transistors Q1 and Q2. Capacitor C36 provides a shunt path to ground for the high frequency components in the collector output of transistor Q1.

When the oscillator 301 is operating and the proximity switch 101 is unoperated (untouched), the detected signal level keeps transistor Q1 on thereby turning transistor Q2 off. When a customer touches the touch-button 10, he essentially connects point X in the circuit to a virtual ground, thereby sharply attenuating the signal. Reduction in signal level is sensed by transistor Q1 which turns off and transistor Q2 turns on. The output of transistor Q2 applied to the output point 37 is employed to actuate a reed switch or other switching device to initiate a dialing signal or otherwise to effect the desired connection to a distant station corresponding to the proximity switch 101. The effective capacitance to ground introduced by touching the button 10 is typically on the order of 150 pf.

Figure 5:
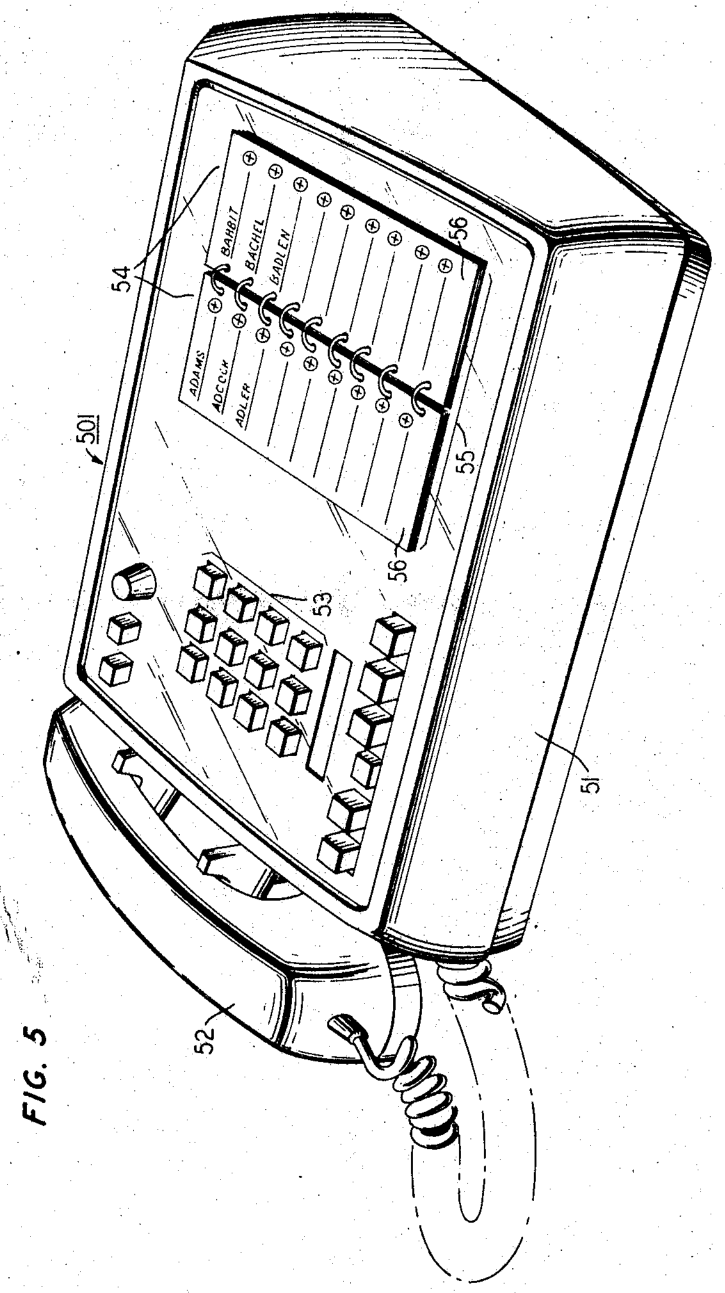
FIG. 5 is a perspective view of a sketch of a DSS set in accordance with the invention utilizing proximity switches arranged in a book-like array.

A proximity switch in accordance with the invention is extremely versatile in that it may be fabricated in a number of different forms, making it readily adaptable for use in a variety of DSS telephone sets and systems. As shown in FIG. 5, for example, groups of proximity switches 54 are fabricated on respective plastic sheets 56 to provide a book-like array 55 which may be employed to gain access to the storage unit (not shown) of a repertory dialer telephone set 501. The set 501, which includes a handset 52, a Touch-Tone dial 53 and a housing 51, is in other respects substantially conventional and may for example utilize the repertory storage and associated circuitry shown by R. A. Miller et al. in the patent cited above. As shown, space is provided on each of the pages 56 of the book-like directory 55 for recording the party name or other station identifying indicia adjacent to each of the touch-buttons 54. Implementing circuitry may be of the form shown in FIG. 3. Flexible leads, not shown, may be brought out from each of the touch-buttons 54 to permit turning the pages 56 without disrupting the necessary circuit connections shown in FIG. 3. It is of course evident that the conventional Touch-Tone dial 53 could be readily modified to utilize proximity switches in accordance with the invention in a manner analogous to that shown by L. R. Learner in U.S. Patent 3,281,541, issued Oct. 25, 1966.

Figure 6:
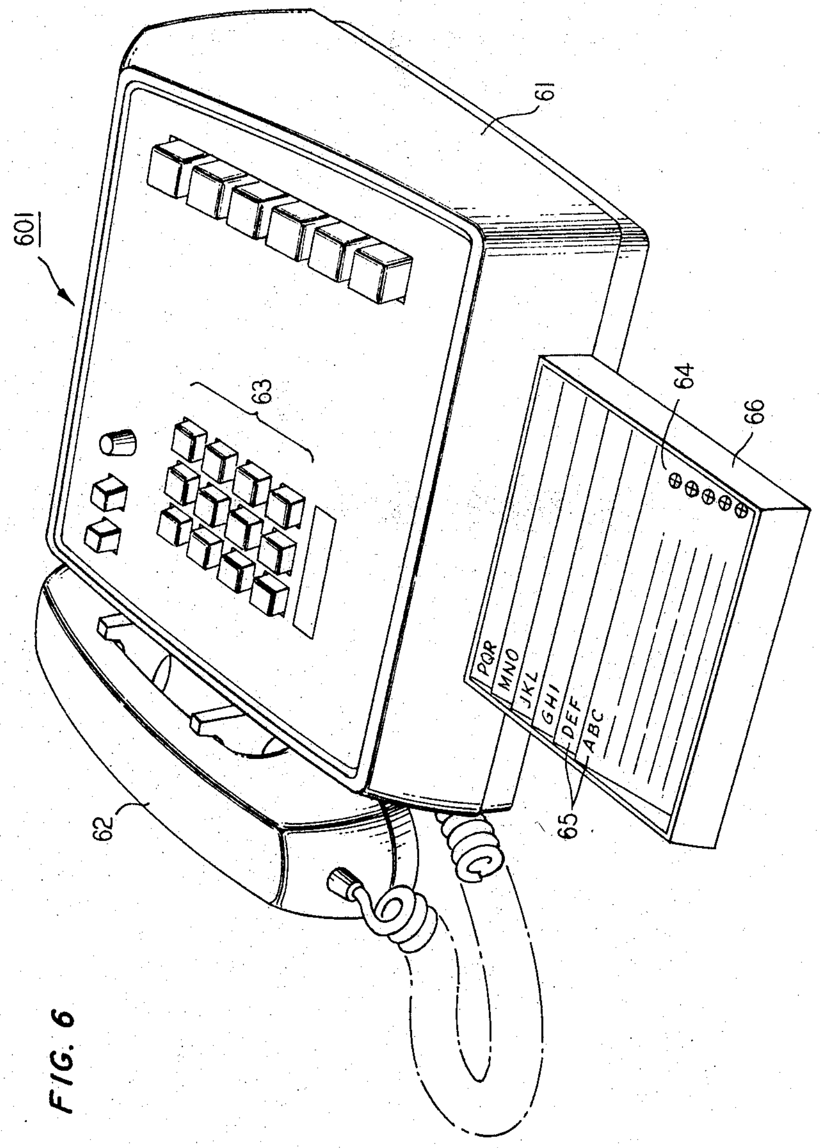
FIG. 6 is a perspective view of a sketch of a DSS set in accordance with the invention utilizing proximity switches arranged in a card file type array.

Another arrangement of proximity-type, direct station selection switches in accordance with the invention is shown in FIG. 6. A repertory dialer telephone set 601, including a housing 61, handset 62 and a Touch-Tone dial 63, is equipped with a card file drawer 66 which may be withdrawn from the housing 61. Access to the repertory store (not shown) of the telephone set 601 is provided by the proximity switch touch-buttons 64, a number of which are fabricated on each of a plurality of plastic index cards 65 which may conveniently be filed alphabetically as shown. With the set shown in FIG. 6 a call to a distant station having its directory number recorded in the telephone set repertory may be initiated simply by touching that one of the touch-buttons 64 which corresponds to the stored directory number of the station to be called.

Figure 7:
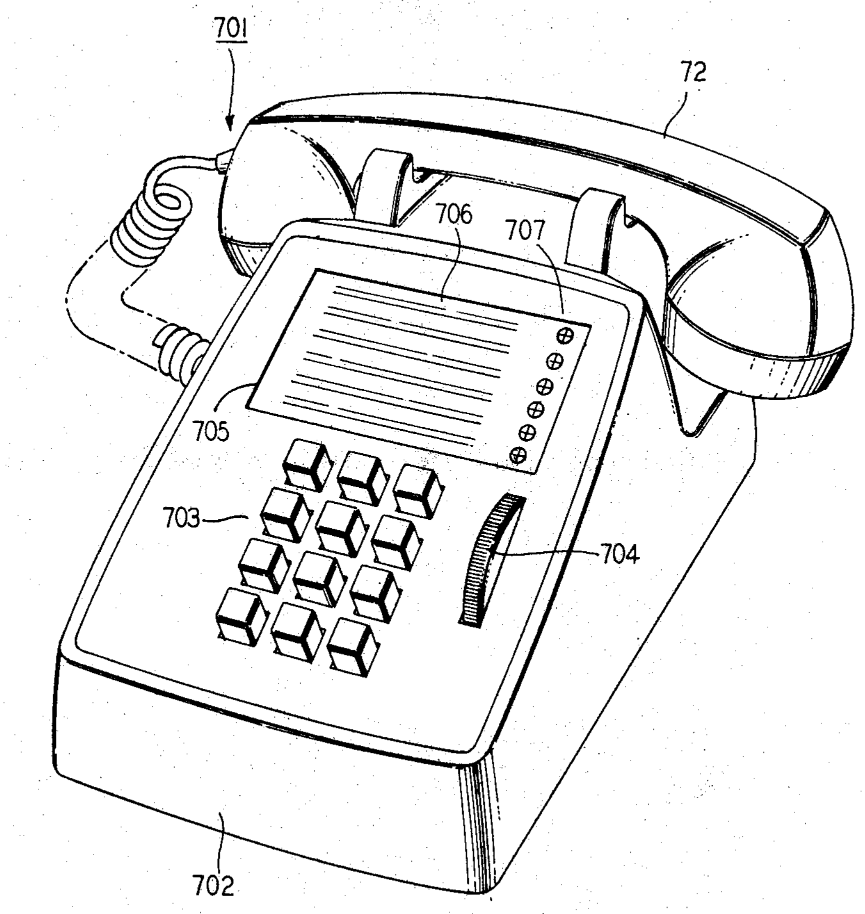
FIG. 7 is a perspective view of a sketch of a DSS set in accordance with the invention utilizing proximity switches arranged in a repertory dialer scroll-type array.

Another DSS switch array in accordance with the invention is shown in FIG. 7 in combination with a repertory dialer telephone set 701. In this case all of the DSS proximity switches 707 are fabricated on a single sheet of plastic 706 which is mounted in scroll form within the telephone housing 702, so that selected ones of the switches and their corresponding written station indicia are exposed to visual and manual access through window 705. The scroll may be rotated by a suitably connected thumb wheel 704 or, alternatively, may be motor driven in a manner well known in the art. Electrical connections to the switches on the moving scroll may be provided by way of simple leaf spring contacts or by encapsulating the necessary leads in the substrate and making connections thereto at the anchored end of the scroll. Again, as in the embodiments shown in FIGS. 5 and 6, a call to a distant station may be initiated simply by removing the handset 72 from its cradle and by touching that one of the pushbuttons 707 which corresponds to the stored number in the repertory representing the station to be called.

Figure 4:
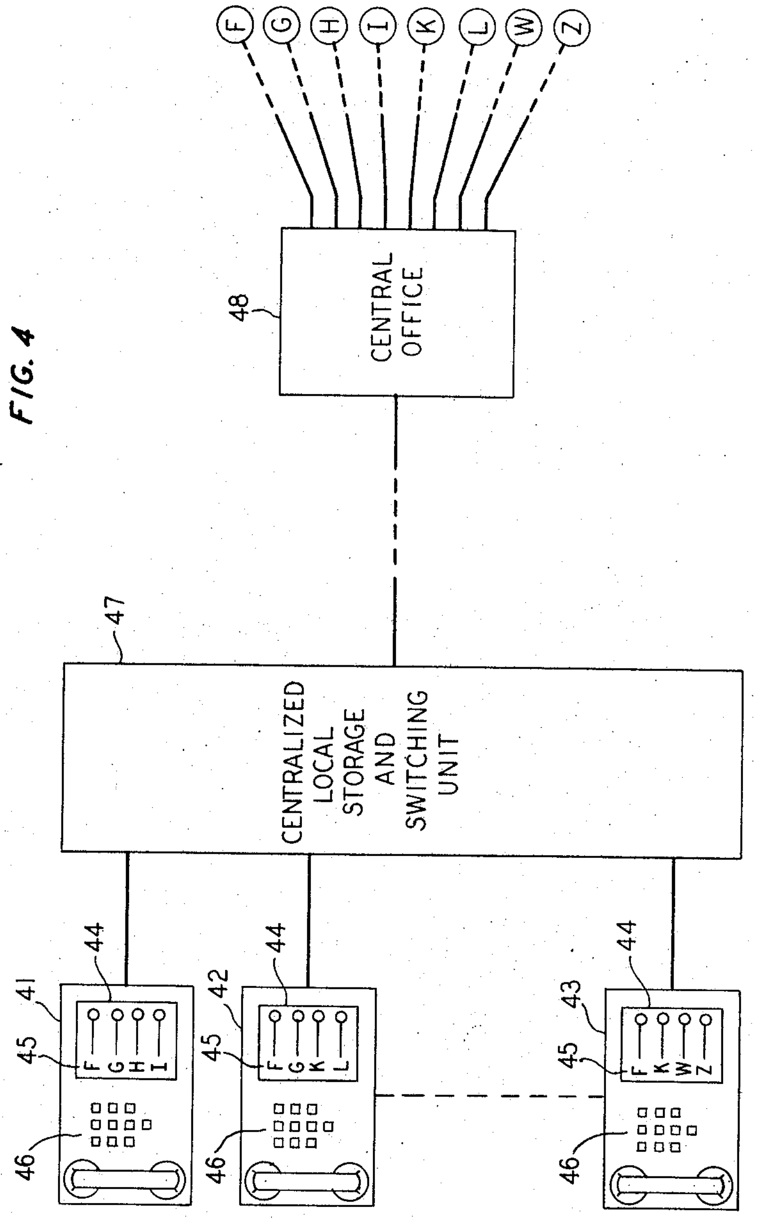
FIG. 4 is a block diagram of a DSS system in accordance with the invention.

From a system standpoint any one of a wide variety of direct station selection arrangements is possible with telephone sets utilizing proximity switch combinations in accordance with the invention. One such system is shown, for example, in FIG. 4. A plurality of DSS sets 41, 42 and 43 each includes a Touch-Tone dial 46 and an array of proximity switches 44 corresponding to written station indicia 45. Operation of any one of the touch-buttons 44 is detected in the manner described above and an appropriate signal is sent to the centralized local storage and switch unit 47 which may include equipment of the type shown by R. A. Plyer in either of the patents cited above to effect the interconnection with one of the stations in the local system. Alternatively, a suitable signal may be sent to the unit 47 and, after suitable translation, to the central office 48 to effect the usual switching required to complete a connection to a selected distant station served by the central office.

Figure 8:
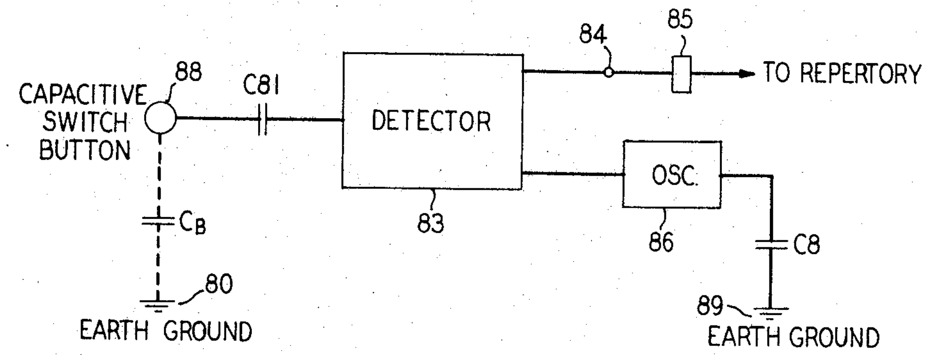
FIG. 8 is a block diagram of a single element type of proximity switch and associated circuitry in accordance with the invention.

In accordance with the invention, as shown in FIG. 8, a somewhat simplified proximity switch may be utilized to effect DSS connections. For each proximity switch of this simplified type only a single conductive pad 88, which also serves as the touch-button, is employed in lieu of the three pads required by the switch shown in FIG. 1. Otherwise, construction of the switch inself is similar in that the single conductive element 88 of each switch is mounted on a common plastic substrate. The circuit of FIG. 8 requires a detector 83 and an oscillator 86 similar to that utilized by the arrangement shown in FIG. 3, although the specific manner of operation is different. Capacitor $C_B$ represents the capacitance of the human body to earth ground which normally exceeds 40 pf. With the introduction of capacitor $C_B$ into the circuit, a path is completed from the touch-button 88 to earth ground 80. Touch-button 88 is also connected to the detector 83 through the capacitor C81 which limits the signal input so that the detector 83 is not overdriven even if the button 88 is physically connected to the earth ground 80. The output from the detector 83 is applied to an output point 84 to operate a suitable switch 85 which initiates the desired connection. The circuit path back to earth ground 89 is completed through the oscillator 86 and through a large coupling capacitor C8. The output signal frequency and amplitude of the oscillator 86 are designed to be sufficiently high so that the human body capacitance $C_B$ couples enough energy into the detector 83 to permit the detector to generate a usable output. An oscillator frequency of 10 kc. and a 10-volt, peak-to-peak output would, for example, be suitable.

Figure 9:
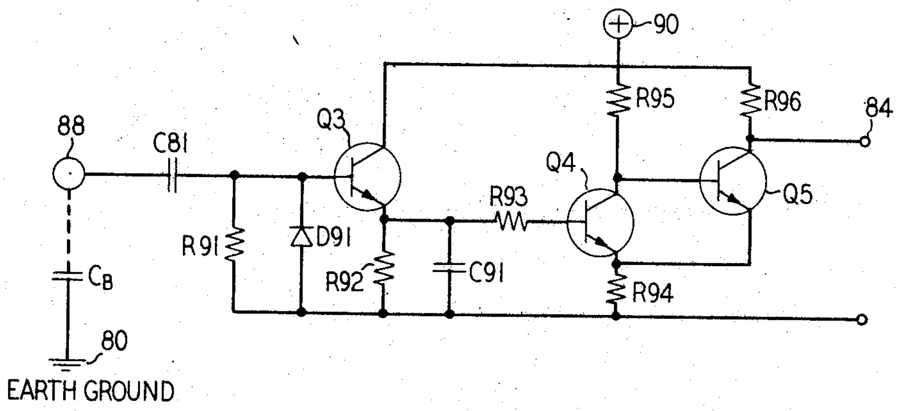
FIG. 9 is a schematic circuit diagram of the detector shown in block form in FIG. 8.

Details of the detector circuit 83 are shown in FIG. 9. The detector comprises the common emitter transistors Q3, Q4 and Q5. Resistors R91, R92, R93, R94, R95 and R96 in combination with the power source 90 provide the proper biasing potentials for the transistors. Capacitor C91 serves the same signal filtering function as capacitor C36 shown in FIG. 3. The diode D91 protects the base-emitter junction of transistor Q3 from reverse breakdown.

In operation, transistor Q5 is normally saturated and both transistors Q3 and Q4 are off. An oscillator input to the detector, which appears upon the introduction of the capacitance $C_B$ into the circuit, is detected and amplified by transistor Q3, integrated by capacitor C91, and the resultant D.C. level is employed to turn on transistor Q4 thereby turning transistor Q5 off. The change of state as applied to the output point 84 is utilized to initiate switching as described above. The circuit shown may readily be designed to change the output state of transistor Q5 if the body capacitance $C_B$ exceeds 30 pf. Requiring capacitance of this level reduces the possibility of erroneous triggering which might otherwise be caused by static charges or stray capacitances.

Figure 10:
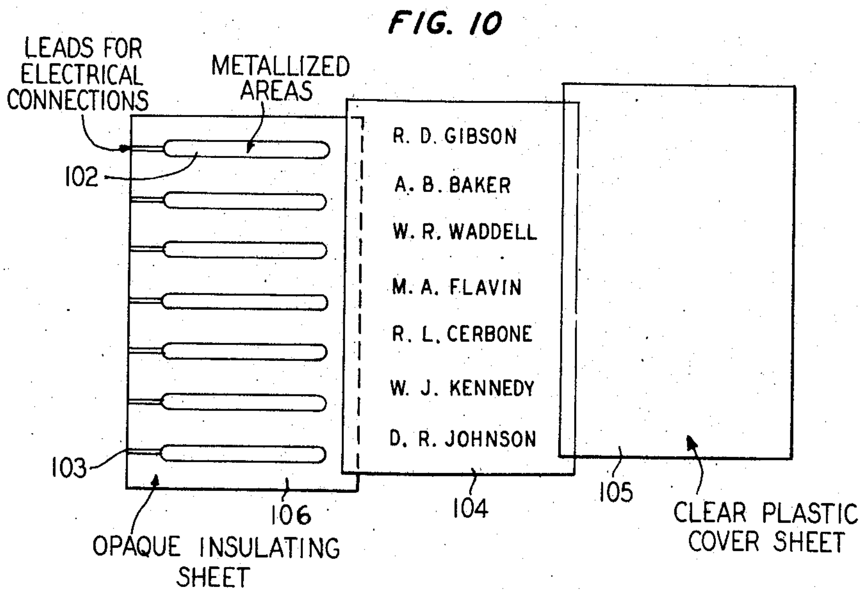
FIG. 10 is a sketch of a multi-switch display arrangement for a DSS telephone set employing the single element type of switch shown in FIG. 8.

Owing to its simplicity, the single lead, single element type of switch shown in FIGS. 8 and 9 is particularly suitable for a DSS switch array of the type shown in FIG. 10. In FIG. 10 a number of elongated metallized areas 102, each having a respective connecting lead 103, are deposited or otherwise affixed to an opaque insulating sheet 101. A sheet of paper 104 with station names corresponding to the touch-buttons 102 printed or typed thereon is placed directly over the sheet 101 so that each printed indicia is superimposed on a corresponding one of the touch-buttons. A clear plastic protective cover sheet 105 may then be positioned over the name sheet 104. The assembly of the three sheets 101, 104 and 105 may then be suitably mounted on the face portion of a repertory dialer or other form of DSS telephone set, so that a call may be initiated simply by touching the plastic sheet 105 directly over the printed name of the party to be called. The arrangement shown in FIG. 10 may be readily modified to permit fabrication and installation of the selector switches in book, scroll or index card form as shown in FIGS. 5, 6 and 7.

It is to be understood that the embodiments disclosed herein are merely illustrative of the principles of the invention. Various modifications thereto may be effected by persons skilled in the art without departing from the spirit and scope of the invention.

What is claimed is:

1. A direct station selection telephone set comprising, in combination, a plurality of proximity switches, each of said switches comprising at least one conductive element mounted on a common substrate, one of said elements in each of said switches comprising a respective touch-button, means for detecting the operation of one of said touch-buttons, and means responsive to said detecting means for initiating the automatic transmission of signal indicia associated with a distant station corresponding to an operated one of said touch-buttons.

2. Apparatus in accordance with claim 1 wherein said detecting means includes an oscillator and a solid state device operated detector circuit.

3. Apparatus in accordance with claim 2 wherein each of said switches comprises three of said conductive elements, said touch-button being mounted on one side of said substrate and the other two of said three elements being mounted on the opposite side of said substrate, thereby to form the circuit equivalent of a capacitive T attenuator circuit which circuit is completed by the operation of the corresponding one of said touch-buttons, said attenuator controlling the application of signal energy from said oscillator to said detector circuit.

4. Apparatus in accordance with claim 2 wherein each of said switches includes only a single respective one of said conductive elements, each serving as one of said touch-buttons and each being mounted on the same side of said substrate.

5. Apparatus in accordance with claim 4 wherein a capacitive conducting circuit path controlling the application of the output of said oscillator to said detector circuit is completed by the operation of one of said switches.

6. A direct station selection telephone set comprising, in combination, a plurality of groups of proximity switches, each of said switches in each of said groups comprising at least one conductive element mounted on a respective one of a plurality of substrate members each being common to all of said switches in a particular one of said groups, one of said elements in each of said switches comprising a respective touch-button, means for detecting the operation of one of said touch-buttons, and means responsive to said detecting means for initiating the automatic transmission of signal indicia associated with a distant station corresponding to an operated one of said touch-buttons.

7. Apparatus in accordance with claim 6 wherein said set includes a housing with a face portion, said substrate members being mounted in book-fashion on said face portion thereby to permit ready visual and manual access to successive ones of said groups of switches by pivotally turning successive ones of said substrate members as in turning the pages of a book.

8. Apparatus in accordance with claim 6 wherein said set includes a housing member with a drawer-type container slidably mounted therein, said substrate members being filed in card file fashion in said container, thereby to permit ready manual and visual access to any selected one of said groups of switches.

9. A direct station selection telephone set comprising, in combination, a telephone set housing, a plurality of proximity switches, each of said switches comprising at least one conductive element mounted on a common flexible substrate sheet, one of said elements in each of said switches comprising a touch-button, means for storing said sheet substantially within said housing in scroll form, said housing having an opening therein providing visual and manual access to a portion of said sheet, means for selectively positioning said sheet, means for detecting the operation of one of said touch-buttons, and means responsive to said detecting means for initiating the automatic transmission of signal indicia representative of a distant station corresponding to an operated one of said touch-buttons.

10. A direct station selection telephone set comprising, in combination, a plurality of proximity switches, each of said switches including a conductive touch-button, a plurality of said touch-buttons being mounted on a common substrate, means for detecting the touch-operation of one of said switches, and means responsive to said detecting means for initiating the establishment of a communication path between said set and a distant station corresponding to the touch-operated one of said touch-buttons.

11. Apparatus in accordance with claim 10 wherein said detecting means includes an oscillator and a detector circuit, means for energizing said oscillator, a conductive path for applying output signals from said oscillator to said detector circuit, the touch-operation of one of said touch-buttons establishing a capacitive shunt path from said conductive path to a point of fixed reference potential, thereby sharply attenuating the transmission of signals from said oscillator to said detector, said detector circuit being responsive to the reduced signal input level effected by said attenuating.

12. Apparatus in accordance with claim 10 wherein said detecting means includes an oscillator and a detector circuit, said oscillator being connected between said detector and a point of fixed reference potential, means connecting said detector circuit to one of said touch-buttons, whereby the touch-operation of said last named touch-button completes a capacitive path from said last named touch-button to said point of fixed reference potential thus establishing a complete circuit path permitting the transmission of the output signal of said oscillator to said detector.

13. Apparatus in accordance with claim 12 including a first capacitive element connected between said oscillator and said point and wherein said connecting means comprises a second capacitive element.

14. A direct station selection telephone set comprising, in combination, a plurality of proximity switches each comprising only a single conductive touch-button mounted on a common nonconductive substrate sheet, a single oscillator, a plurality of detector circuits each corresponding to a respective one of said touch-buttons, the touch-operation of one of said touch-buttons completing a capacitive path to earth ground thereby establishing a complete circuit enabling the transmission of the output signal from said oscillator to that one of said detector circuits corresponding to the operated one of said touch-buttons, and means responsive to the detection of said output signal by one of said detector circuits for initiating the establishment of a communication path between said set and a distant station corresponding to said operated touch-button.

References Cited

UNITED STATES PATENTS

| | | |
|---|---|---|
| 3,419,697 | 12/1968 | Gove. |
| 3,428,758 | 2/1969 | Hall. |

KATHLEEN H. CLAFFY, Primary Examiner

BARRY PAUL SMITH, Assistant Examiner

U.S. Cl. X.R.

200—52